MULTIPURPOSE INTEGRATED CIRCUIT ARRANGEMENT
Filed Aug. 28, 1968 4 Sheets-Sheet 1
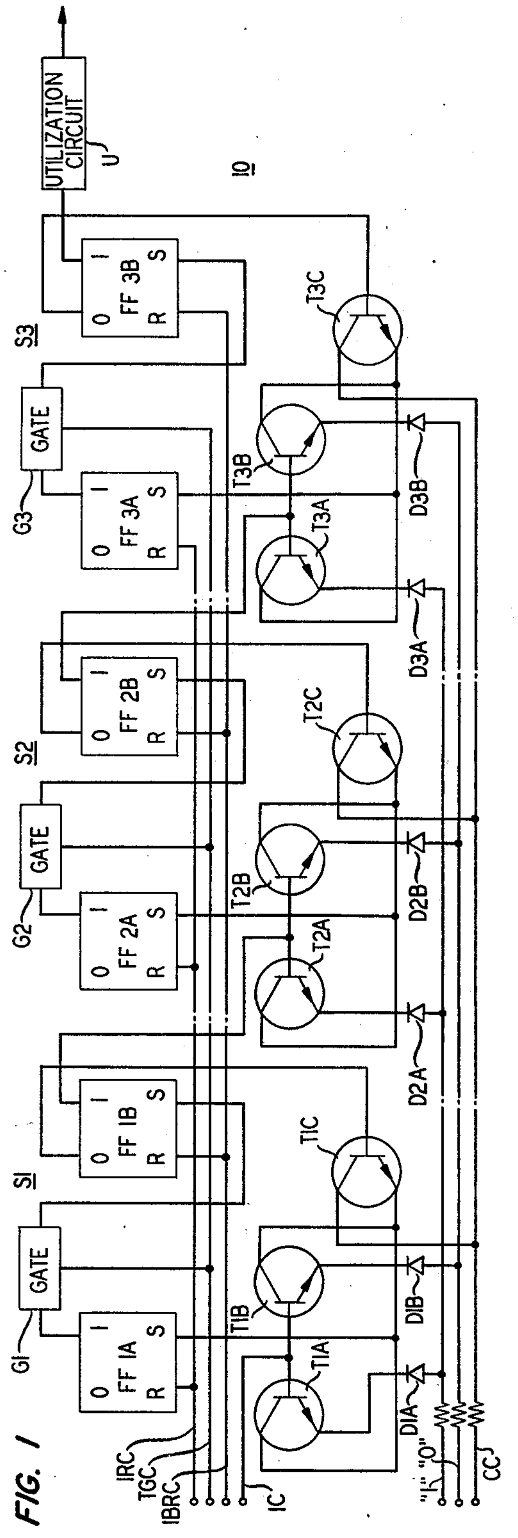
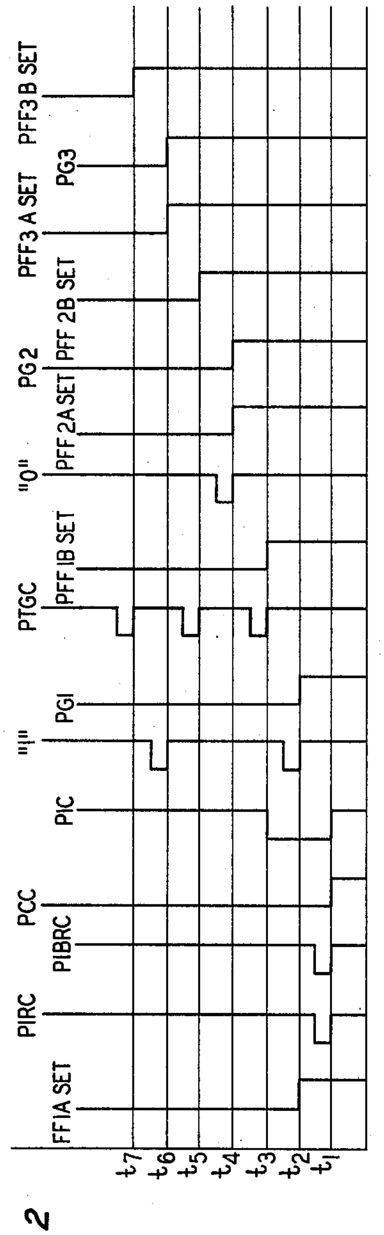
FIG. 2
INVENTORS R. V. GUNTHER
R. A. KAENEL
M. P. LEPSELTER
J. L. SMITH
BY Herbert M. Shapiro
ATTORNEY

| | FF1A | FF1B | FF2A | FF2B | FF3A | FF3B | FF4A | FF4B |
|---|---|---|---|---|---|---|---|---|
| IBRC & IRC | 0 | 0 | 0 | 0 | 0 | 0 | 0 | 0 |
| 100 BASE | 0 | 0 | 1 | 0 | 1 | 0 | 0 | 0 |
| TGC | 0 | 0 | 1 | 1 | 1 | 1 | 0 | 0 |
| IRC | 0 | 0 | 0 | 1 | 0 | 1 | 0 | 0 |
| 121 | 0 | 0 | 0 | 1 | 1 | 1 | 1 | 0 |
| IBRC | 0 | 0 | 0 | 0 | 1 | 0 | 1 | 0 |
| TGC | 0 | 0 | 0 | 0 | 1 | 1 | 1 | 1 |
| IRC | 0 | 0 | 0 | 0 | 0 | 1 | 0 | 1 |
| 121 | 0 | 0 | 0 | 0 | 0 | 1 | 1 | 1 |

United States Patent Office 3,500,148
Patented Mar. 10, 1970

3,500,148
MULTIPURPOSE INTEGRATED CIRCUIT ARRANGEMENT

Ronald V. Gunther, Cranford, Reginald A. Kaenel, Chatham, Martin P. Lepselter, New Providence, and James L. Smith, Bedminster, N.J., assignors to Bell Telephone Laboratories, Incorporated, Murray Hill, N.J., a corporation of New York
Filed Aug. 28, 1968, Ser. No. 756,073
Int. Cl. H01l 19/00
U.S. Cl. 307—303 9 Claims

ABSTRACT OF THE DISCLOSURE

An integrated circuit can be made to serve a plurality of different functions if the internal logic of the circuit is organized so that internal paths of the circuit can be short-circuited or open-circuited permanently thus selecting prescribed paths for later operation. The tailoring of a multipurpose integrated circuit for serving functions such as sequence detection is described.

FIELD OF THE INVENTION

This invention relates to semiconductor integrated circuits and more particularly to multipurpose integrated circuits the normal operation of which may be set permanently in accordance with prescribed signals.

BACKGROUND OF THE INVENTION

The economies of microminiature semiconductor circuits such as integrated circuits are realized primarily because large numbers of like circuits are fabricated simultaneously. Individual tailoring of circuits to fit individual requirements offsets many of the economic advantages.

But individual tailoring is what is required in many circumstances. Character recognizers, for example, must be responsive to different incoming pulse codes in order to fill the needs of selective dialing without wires such as in radio telephone circuits. Accordingly, individual circuits must be tailored to be responsive to different codes. Yet the minute size of integrated circuits precludes ready access for performance selection or modification.

An object of this invention is to provide a semiconductor integrated circuit which may be adapted electronically to respond permanently to a selected pulse sequence.

A variety of circuits including a matrix of fusible elements are available at present. Associated with each of the fusible elements in such circuits is an active element which is permanently active or inactive according to the status of the associated fusible element. A decoding function may be performed by the active elements depending on which of the fusible elements is open-circuited and which is not.

The status of each fusible element is determined by a pulse applied to peripheral conductors leading to the integrated circuit and connected to that element in the usual coordinate arrangement. Thus, for a matrix of $n^2$ elements, $2n$ conductors are required and $2n$ connections to the outside world are also required. This number of peripheral connections is not only uneconomically high but also a large number of those conductors are unused after the initial selection of paths. Moreover, only a decoding function is realized by such circuits. That is to say, the resulting circuit functions to provide coded outputs along one set of coordinate conductors in response to inputs on the other set.

Another object of this invention is to provide a multipurpose integrated circuit including essentially only those peripheral connections which are required for normal operation.

BRIEF DESCRIPTION OF THE INVENTION

The invention is based on the realization that a plurality of logic functions may be performed selectively by a multipurpose integrated circuit which includes both logic elements and passive elements wherein the permanent states of the latter are determined prior to normal operation in accordance with the states of the logic elements.

In one embodiment of this invention, a multistage, character recognizer (viz, sequence detector) includes a plurality of conductors internal to the integrated circuit and connected to each stage in a like manner. Control elements in each stage are selectively short-circuited depending on the state of flip-flops in the preceding stage. Only one additional peripheral connection over and above those necessary for normal operation is required for controlling the modification of the control elements in consecutive stages.

In another embodiment, additional functions can be performed by a circuit similar to the character recognizer by altering the internal organization of that circuit in accordance with prescribed signals. Specifically, a shift register or, alternatively, program generators as well as tailored sequence detectors may be provided with similar circuitry by changing the pattern of active control elements.

BRIEF DESCRIPTION OF THE DRAWING

FIG. 1 is a schematic illustration of a circuit in accordance with this invention;

FIG. 2 is a timing diagram of the operation of the circuit of FIG. 1;

DETAILED DESCRIPTION

Figure 3:
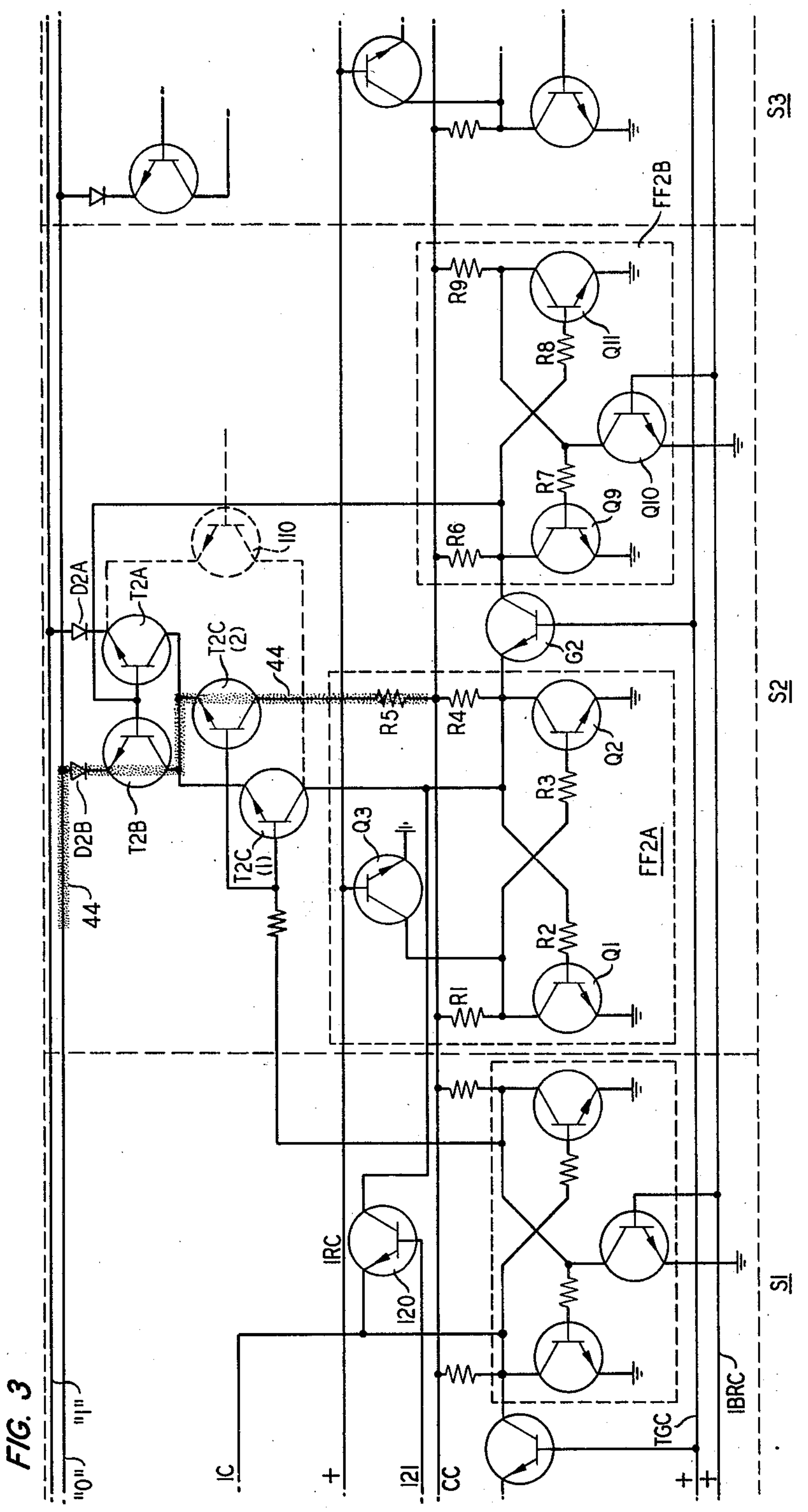
FIGS. 3 and 4 are schematic illustrations of portions of the circuit of FIG. 1.

FIG. 1 shows a plurality of stages of an illustrative character recognizer 10 in accordance with this invention. Three stages S1, S2, and S3 are shown illustratively. Each stage includes an A and a B flip-flop. The designations of the flip-flops, then, are FF1A, FF1B, FF2A . . . , reflecting the stage in which the flip-flop so designated is situated.

Each stage also includes A and B transistors designated T1A, T1B, T2A . . . , again to reflect the corresponding stage. The emitters of the A and B transistors for the various stages are connected, by means of correspondingly designated fusible diodes (D), to "1" and "0" input conductors connected to "1" and "0" input lines respectively. The "1" and "0" input lines are so designated because voltages are applied illustratively to those lines when "1" and "0" information representations are received by an input means not shown.

The collectors of each pair of A and B transistors are connected electrically in parallel to the emitter of an associated additional transistor T1C, T2C, and T3C. The collector of the additional (C) transistor in each stage is connected to a control conductor CC.

An information reset conductor IRC is connected to the RESET input of each A flip-flop in the recognizer. An information buffer reset conductor IBRC is connected to the RESET input of each B flip-flop in the recognizer. The collectors of the A and B transistors of each stage are connected to the SET input of the corresponding A flip-flop. The SET output of each A flip-flop is connected through a gate (viz, G1, G2, and G3) to the SET input of the corresponding B flip-flop. The SET outputs of the B flip-flops are connected to the bases of the A and B transistors of the next consecutive stage. An initiate conductor IC is connected to the bases of the A and B transistors in stage one.

The A and B diodes are of a fusible structure to provide a short circuit when a current of a predetermined minimum level is exceeded in it. The structure and operation of such a diode are discussed hereinafter.

The circuit of FIG. 1 operates initially to short-circuit selected ones of the A and B diodes and thus to determine permanently the incoming pulse sequence to which the recognizer responds correctly as is now described.

Operation of the circuit of FIG. 1 is initiated by a pulse PIRC on conductor IRC which resets all the A flip-flops in the recognizer as shown at time $t_1$ in FIG. 2. Pulse PIRC is accompanied by a pulse PIBRC on conductor IBRC to reset all the B flip-flops in the recognizer. Simultaneously, a voltage is applied to conductor CC as shown by the pulse PCC initiated at time $t_1$ in FIG. 2. A positive voltage is applied to conductor IC also at time $t_1$, to enable transistors T1A and T1B, as shown by the pulse PIC in FIG. 2.

Next a sequence of coded pulses are applied to the "1" and "0" conductors for coding the register. Consider an illustrative code 101. First a pulse is applied on the "1" conductor at time $t_2$ in FIG. 2. In response, diode D1A is back-biased to an extent above its fusing level to short-circuit that diode permanently. The mechanism for short-circuiting the diode is discussed hereinafter.

The back-biasing voltage for diode D1A is applied between conductors "1" and CC. Specifically, diode D1A is included in the collector-emitter circuit of transistor T1A and the collector-emitter of transistor T1C. Transistor T1A is enabled by the pulse on conductor IC; transistor T1C is enabled via the RESET output of flip-flop FF1B. The back voltage across diode D1A then is the voltage difference between the levels on conductors IC and CC, the latter being kept low during the "programming" of the recognizer.

The short circuiting of diode D1A is accompanied by the setting of flip-flop FF1A to the SET input of which the collectors of transistors T1A and T1B are connected. In response, gate G1 is enabled as shown by the pulse PG1 at time $t_2$ in FIG. 2. A pulse PTGC is applied at time $t_3$ to conductor TGC after pulse "1" has been removed. Pulse PTGC activates gate G1 setting flip-flop FF1B as indicated by the pulse PFF1B at time $t_3$ in FIG. 2. Transistors T2A and T2B are now enabled.

The next coded input pulse is a "0." This is indicated by the pulse designated "0" at time $t_4$ in FIG. 2. Diode D2B is now back-biased above its fusing level as determined by the voltage differences between the levels on conductors "0" and CC through the collector-emitter circuits of transistors T2B and T2C. Simultaneously, flip-flop FF2A is set and gate G2 is enabled via pulse PG2 at time $t_4$. At time $t_5$, pulse PTGC is applied again. In response, flip-flop FF2B is set and transistors T3A and T3B are enabled.

The next coded input pulse in accordance with the illustrative coding is a "1." Thus, conductor "1" is pulsed and diode D3A is short-circuited in a manner similar to that described for stage one. The pulse forms for the programming of stage three are shown at times $t_5$ through $t_7$ in FIG. 2 designated as were like pulses in connection with the programming of stage one without further discussion. The recognizer is now permanently set to recognize the incoming pulse sequence 101. For recognition of that sequence, the voltage on conductor CC is lowered so as to back-bias the remaining diode in each stage below its fusing level.

A proper incoming sequence results in the setting of flip-flop FF3B after a prescribed number of pulses. The presence of a set state in flip-flop FF3B is detected conveniently by a utilization circuit U connected to the set output of that flip-flop. Utilization circuit U functions like a gate circuit enabled via the set output of flip-flop FF3B and activated by a synchronizing pulse under the control of a control circuit not shown. When so activated, circuit U provides a pulse useful, for example, for enabling the receipt of a message.

Consider the function of the circuit of FIG. 1 when a correct code 101 is incoming. A "1" pulse appears on the "1" conductor. In response, flip-flop FF1A is set via short-circuited diode D1A. A pulse then is applied to conductor TGC to activate gate G1 thus setting flip-flop FF1B.

The next pulse in the incoming code is a "0" pulse on conductor "0." Flip-flop FF2A is now set via short-circuited diode D2B. A next pulse on conductor TGC activates gate G2 and flip-flop FF2B is set.

The last pulse in the illustrative incoming code is a "1" pulse on conductor "1." Flip-flop FF3A is set, in response, via short-circuited diode D3A. The next pulse on conductor TGC activates gate G3 which, in turn, sets flip-flop FF3B. Utilization circuit U detects a correct incoming code and provides a signal in response to the next subsequent synchronizing pulse. The synchronizing pulse is followed by pulses on conductors IRC and IBRC to reset all flip-flops in anticipation of a next incoming code and a voltage is re-initiated on conductor IC.

Consider the operation of the circuit of FIG. 1 when an incorrect code 001 arrives. The first pulse received is a "0" pulsed on conductor "0." Diode DIB is nonconducting however. Thus, flip-flop FF1A is not set, gate G1 is not enabled, and flip flop FF1B is not set in response to the next subsequent pulse on conductor TGC.

Next consecutive input pulses, although correct, do not result in the setting of corresponding A flip-flops because the associated A and B transistrs are not enabled. When the synchronizing pulse is applied to determine if a correct code was received, flip-flop FF3B is not set and utilization circuit U provides no signal.

A circuit in accordance with this invention has now been described along with the operation to program its permanent response to incoming codes and the operation once that circuit is so programmed. The advantages of such a circuit are more fully appreciated when we consider an integrated circuit in accordance with the schematic shown in FIG. 1. For simplicity, we will confine our attention to an illustrative integrated circuit corresponding to a single stage of the arrangement of FIG. 1. It is to be understood that the integrated circuit may be connected to like circuits in a well-known manner to provide arrangements having arbitrary numbers of stages.

Figure 4:
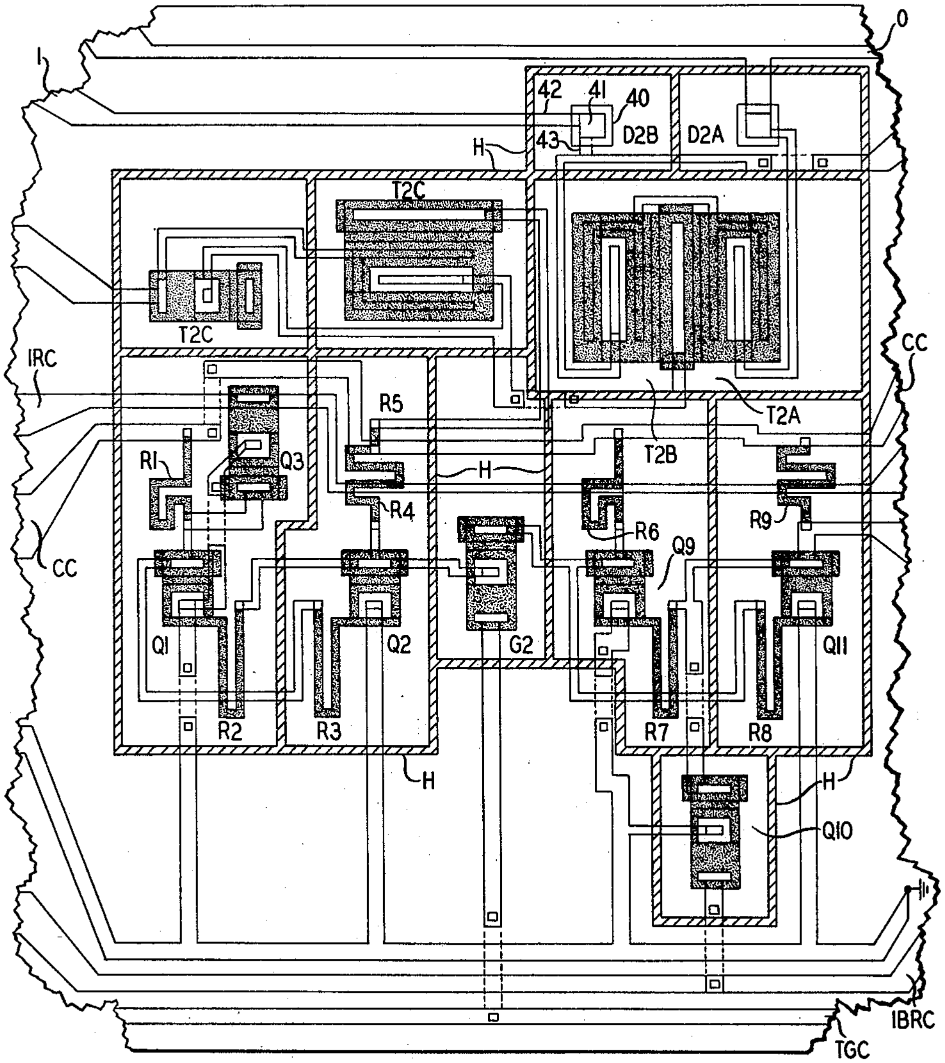

FIG. 3 shows a detailed schematic of the illustrative stage which will facilitate an understanding of the integrated circuit diagram of that stage as shown in FIG. 4. The elements of the circuit are designated as in FIG. 1. The flip-flops, represented only functionally in FIG. 1, are shown in detail in FIG. 3. To avoid confusion, each element in each flip-flop is designated in a manner to identify the corresponding structure in the integrated circuit of FIG. 4. For example, the flip-flop FF2A of FIG. 1 comprises three transistors Q1, Q2, and Q3 and five resistors R1–R5. Flip-flop FF2B, similarly, comprises transistors Q9, Q10, and Q11, and resistors R6–R9. The functions of the components of the flip-flops are well understood in the art.

The elements are formed simultaneously conveniently in a single chip of silicon of minute dimensions. The formation process involves a sequence of photoresist, diffusion, evaporation, back sputtering, et cetera, steps familiar in integrated circuit technology. Although it is unnecessary to detail each and every step or the sequence for an understanding of this invention, it is helpful to discuss briefly a circuit realized by such familiar techniques in terms of the schematic of FIGS. 3 and 4.

FIG. 4 shows an integrated circuit in accordance with this invention. The circuit is formed illustratively in a single chip of p-type silicon having an n-type epitaxial surface layer. Each element is isolated electrically one from the other by highly doped ($10^{20}$ atoms/cc.) regions formed by diffusion and designated H in FIG. 4. These regions can be seen to divide the semi-conductor chip into generally rectangular areas and are usually formed by photoresist techniques before the individual elements are formed and before lead connections are made. Each rectangular area includes an element identified in FIG. 3 and is designated to so correspond. Diffused areas in FIG. 4 are represented by cross-hatched lines encompassing emitter regions which are not cross-hatched. Lead connections are represented by linear areas having no cross-hatching. Areas defined by broken lines indicating flying lead type connections are made, for example, by beam lead techniques.

One of the diode portions D2A and D2B of FIG. 4 is described in detail. The diode is formed by a p-type diffusion 40 of a square geometry. A silicon dioxide layer is grown over the region. A square region is opened in the oxide and thereafter consecutive layers of titanium (200 angstroms) and gold (10,000 angstroms) are deposited over the exposed region. Contacts are made to the diode by means of conductors 42 and 43 which may be deposited by any well-known techniques.

The diodes in FIG. 4 are selectively short-circuited by alloying titanium-gold into the n-type epitaxial substrate to provide a preferred path for current flow. If diode D2B is short-circuited the resulting preferred path corresponds to a coding for detecting a zero and is indicated in FIG. 3 by the darkened meandering linear path 44.

It is to be noted that a transistor T2C is included twice in the circuit of FIG. 3. T2C(1) is a logic level transistor which sets flip-flop FF2A. T2C(2) is a transistor which is capable of supplying the higher (i.e., 25 ma.) current needed to fuse the diodes. The use of two transistors reduces the steady-on power of the flip-flop stages.

Selective tailoring of batch-fabricated, identical integrated circuits by selective alloying to short-circuit diodes has been described in detail. As has been indicated hereinbefore, however, the integrated circuitry can be arranged for open-circuiting of selected diodes for "activating" an alternative path for normal operation. This alternative mode of operation is realized in a manner similar to that described and usually entails the vaporization of diode lead connections and may involve oppositely poled circuit elements.

Figures 5, 6:
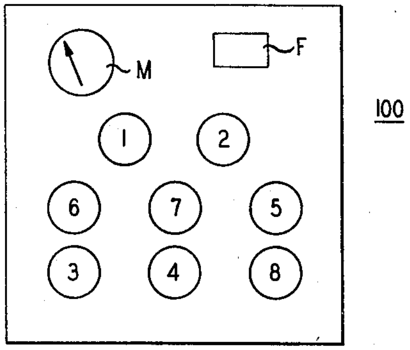
FIG. 5 is a top view of apparatus suitable for programming the circuit of FIG. 1.
FIG. 6 is a table showing information states of various logic elements in an alternative circuit in accordance with this invention.

FIG. 5 shows a top view of an illustrative power supply arrangement 100 which can be carried by an installer for selectively altering the internal organization of a multipurpose integrated circuit in accordance with this invention. The arrangement may include, for example, two toggle switches corresponding to numerals 1 and 2 as shown, and a plurality of pushbuttons corresponding to numerals 3, 4, 5, 6, 7, 8, and 9. The toggle switches supply high and relatively low power, respectively, to line CC of FIG. 3 for first setting and then testing the multipurpose circuit. Pushbuttons 3 4, and 8 provide pulses on lines (1), (0), and (TGC) in FIG. 3. Pushbuttons 6 and 7 provide pulses to reset A and B flip-flops of FIG. 1. Pushbutton 5 provides a pulse on line IC of FIG. 3 to initiate the system. The arrangement also may include a meter M which is useful to register, during a test operation, the condition of an interrogated stage, and a receiving jig F with which interconnected integrated circuits of the type shown in FIG. 4 mate. The arrangement is portable having dimensions substantially smaller than a pushbutton telephone and having correspondingly lower weight. The circuitry of arrangement 100 necessary for generating the pulse sequence of FIG. 2 is straightforward to one skilled in the art and a discussion thereof is not necessary for an understanding of this invention.

The programming of a multipurpose integrated circuit to provide a sequence detection function fully demonstrates the considerable flexibility of a circuit in accordance with this invention because each detector, after programming, is of necessity unique. But even further flexibility can be realized by multipurpose circuits utilizing internal logic to preset the operative configuration of the circuit in accordance with this invention. For example, a character generation function as well as a detection function can be realized from a single multipurpose circuit only slightly different from that shown in FIG. 3. FIG. 3 shows, in broken line form, a transistor 110. The transistor is connected in each stage of a multistage circuit in accordance with this invention and permits the programming of sequence generation as well as detection functions. The emitter of each such transistor is connected to the emitter of, for example, transistor T2A as shown for stage two in FIG. 3. The collector of the transistor is connected to the collector of transistor T2C. The base of the transistor 110 in each stage is connected in parallel to, say, the arrangement 100 of FIG. 5 for provision of pulses thereto. In the stages where the A diodes are shorted during a programming operation, the A flip-flops are set when the bases of transistors 10 are later pulsed. Where the B diodes are shorted, the B flip-flops are set.

An additional transistor 120 between each pair of adjacent stages permits the shifting of the information so stored to a terminal stage for generating the specified pulse sequence. FIG. 3 shows the emitter-collector circuit of an additional transistor connected between line IC and the collector of transistor T2C. The base of that transistor in each stage is connected electrically in parallel, via a peripheral line 121, to an additional terminal (not shown) on arrangement 100.

FIG. 6 is chart showing the disposition of information in a multistage multipurpose character generator of the type shown in FIG. 3 including transistors 110 and 120 in each stage. The columns of the chart are designated, left to right, to correspond with the consecutive flip-flops in which information is stored. The rows of the chart are labeled by the designations of the corresponding lines in FIG. 3 which are pulsed to move stored information as indicated in the chart. The sequence begins at the top row with the pulsing of lines IBRC and IRC concurently to set all flip-flops to zero as indicated. Let us assume that the diodes D2A and D3A are short-circuited as discussed hereinbefore for illustration purposes. All the bases of transistors 110 are next pulsed and, as a result, only flip-flops FF2A and FF3A are set. A pulse is then applied to line TGC setting only the B flip-flops following the set A flip-flops. Next, line IRC is pulsed resetting only the set A flip-flops. Line 121 is next pulsed setting the A flip-flops next adjacent the set flip-flops. Line IBRC resets the set B flip-flop when pulsed. The stored information is now advanced one stage and the shifting pulse sequence repeats.

If it were intended to use the circuit only as a shift register, it is necessary only to short-circuit the A or B diode of the first stag of the circuit. Input to the shift register is effected by pulsing the "0" or "1" line, depending on which diode is short-circuited, along with a pulse on line IC and the base of transistors 110 to enable the corresponding flip-flop to be set.

A multistage multipurpose circuit as shown in FIG. 3 including transistors 110 and 120 thus can be programmed to provide sequence detection, sequence generation, or shift register operations in accordance with this invention. For achieving sequence detection, the presence of transistors 110 and 120 in the multipurpose circuit along with the accompanying drive lines may be ignored, as is clear from the above discussion in connection with FIG. 1.

What has been described is considered only illustrative of the principles of this invention. Consequently, numerous other modifications in accordance with these principles can be devised by those skilled in the art without departing from the spirit and scope of this invention.

What is claimed is:

1. A semiconductor integrated circuit comprising a plurality of stages each including logic and control elements, each of said control elements having a preliminary and a permanent operative state, first means for selectively setting the states of said logic elements in said stages in accordance with a preselected code, and second means responsive to a control signal for selectively changing said control elements from said preliminary to said permanent operative states in accordance with said preselected code.

2. A semiconductor circuit in accordance with claim 1 wherein said first means comprises input connections to the logic elements in each of said stages wherein said input connections are electrically in parallel.

3. A semiconductor circuit in accordance with claim 1 wherein each of said control elements comprises means for defining an open circuit, and said second means comprises means for selectively short-circuiting said control elements.

4. A semiconductor circuit in accordance with claim 1 wherein each of said control elements comprises means for defining a short circuit, and said second means comprises means for selectively open-circuiting said control elements.

5. A semiconductor circuit in accordance with claim 1 wherein said second means includes an input connection to all of said stages responsive to sequential control signals for selectively changing said control elements from said preliminary to said permanent operative states sequentially in accordance with said preselected code.

6. A semiconductor circuit in accordance with claim 3 wherein each of said control elements comprises a diode comprising a region of a first conductivity type juxtaposed with a region of a second conductivity type, the latter region including an impurity which is alloyed into said first region responsive to said control signal for forming a conducting path.

7. A semiconductor circuit in accordance with claim 3 including means for applying to said circuit a sequence of information representations, said circuit being adapted to provide an output pulse only when said sequence matches said preselected code.

8. A semiconductor circuit in accordance with claim 7 also including output means for detecting the presence and absence of said output pulse.

9. A semiconductor circuit in accordance with claim 3 also including means for advancing the states of said logic elements synchronously through said stages, and output means for providing sequential indications of said states.

References Cited

UNITED STATES PATENTS 3,423,646 1/1969 Cubert et al. -------- 317—235

OTHER REFERENCES

IBM Tech. Disc. Bul., "Memory Array," by De Witt et al., vol. 10, No. 1, June 1967, p. 95.

JERRY D. CRAIG, Primary Examiner

U.S. Cl. X.R.

307—213; 317—235; 328—119